L. WOJIDKOW.
CARRIER FOR CASSEROLES AND OTHER HOT FOOD CONTAINERS.
APPLICATION FILED FEB. 10, 1917.
1,244,395.
Patented Oct. 23, 1917.
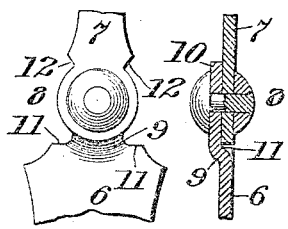
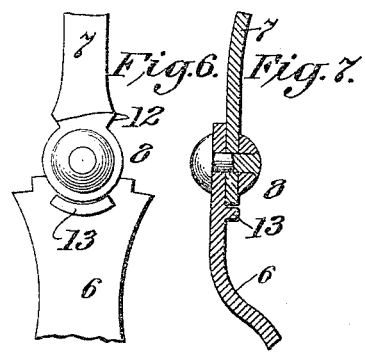
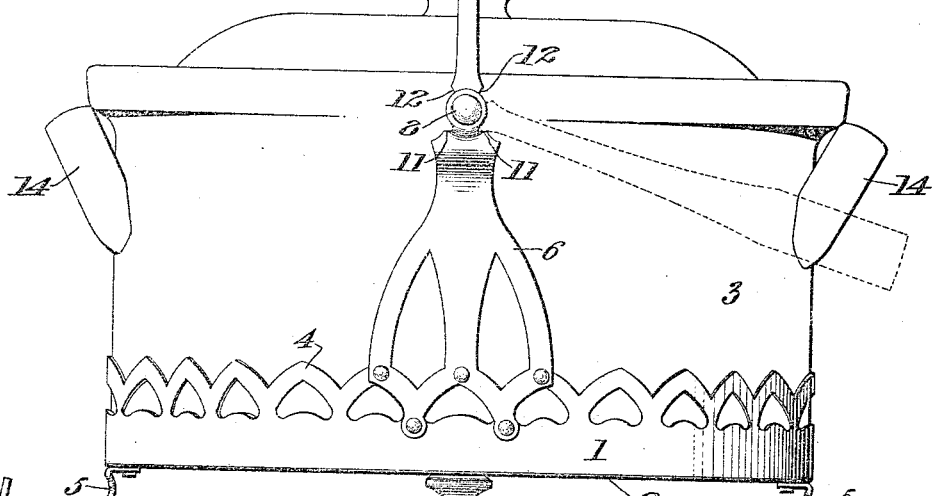
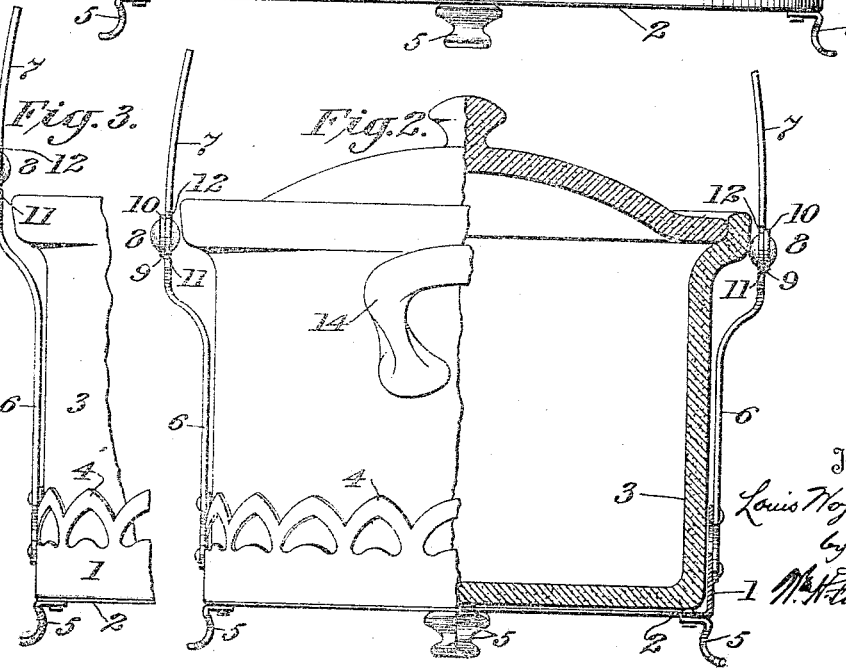
Inventor
Louis Wojidkow
by
W. H. Kinsell
Attorney

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

CARRIER FOR CASSEROLES AND OTHER HOT-FOOD CONTAINERS.

1,244,395.　　　　Specification of Letters Patent.　　Patented Oct. 23, 1917.

Application filed February 10, 1917. Serial No. 147,967.

*To all whom it may concern:*

Be it known that I, LOUIS WOJIDKOW, a citizen of the United States, residing at Brooklyn, in the county of Kings and State of New York, have invented a certain new and useful Improvement in Carriers for Casseroles and other Hot-Food Containers, of which the following is a full, clear, and exact description.

The object of this invention is to provide a comparatively inexpensive and altogether efficient metal frame for holding and carrying hot food containers for table use.

Holders for such containers as now commonly constructed, comprise a metal frame of a height substantially equal to the height of the container or food-holding vessel, such as a casserole, and are provided with stationary handles at their ends or sides by which they may be carried. These holders are always more or less ornate, and serve, in addition to containing the hot vessel, as a sort of table decoration. They are very largely used and are sold at a very small margin of profit, owing, among other things, to the cost of metal. These high-standing holders make it a matter of difficulty to set a hot vessel in them without dropping the same down into the holder, and moreover, the vessels are not easily removed.

The object of the present invention is to overcome these disadvantages, and to produce an ornamental as well as highly useful and efficient holder, and to provide a holder with a movable handle or bail by which it may be readily carried or moved from place to place, and which will permit of the addition of handles to the casserole or food-containing vessel, so that such vessel may be readily handled in putting it in and taking it out of the holder or carrier.

The invention consists of a metal frame of any desired shape and ornamentation, and relatively low in height and adapted to receive and support a hot vessel with or without handles, the frame having upwardly projecting standards provided with hinge ears to which a carrying handle or bail is pivoted, the hinge ears and the bail being provided with coöperating stop members to limit the downward movement of the bail and hold it out of contact with the hot vessel, so that the vessel may be inserted in and removed from the frame readily and conveniently and access to the contents of the vessel rendered easy, as I will proceed now to explain and finally claim.

In the accompanying drawings illustrating the invention, in the several figures of which like parts are similarly designated, Figure 1 is a side elevation showing the invention applied to a casserole having handles, and also showing in dotted lines the bail of the holder or carrier dropped into its stopped position. Fig. 2 is a half section and elevation with the bail broken away. Fig. 3 is a side elevation of a portion of a holder and casserole showing the hinge joint at a different altitude from that in which it is shown in Figs. 1 and 2. Fig. 4 is an inside elevation and Fig. 5 is a longitudinal section on a larger scale, showing details of the hinge joint. Fig. 6 is an inside elevation and Fig. 7 is a longitudinal section illustrating a modification of the hinge joint.

The frame of the holder has a vertical member 1 and a horizontal member 2 to receive and support the container or casserole 3, and the vertical member 1 may be finished with any suitable ornamental top 4, and this frame may be provided with feet 5, as usual, to support the device above the table or other support. As shown, this frame instead of extending up to or nearly to the top of the vessel or casserole, as in prior constructions, has a height of only an inch or two, or sufficient to surround the lower part of the vessel. Applied to the frame in any suitable manner are the side standards 6 of any suitable construction, and extending up nearly to the height of the vessel which the frame is designed to receive, as shown in Figs. 1 and 2, or extending above the top of the vessel as shown in Fig. 3, but in any case of sufficient height to insure the balancing of the device when in use and prevent it from tipping. As shown in Figs.

1, 2 and 3 the standards may be made separate from the frame and riveted to it. To these standards is secured a bail 7 by hinge joints 8, so that the bail may be raised to the vertical position shown in Fig. 1, for carrying purposes, or let down as shown in the dotted line position Fig. 1, so as to be out of the way when inserting the vessel in the frame and when serving from it.

Various forms of hinge joints may be used, but I prefer to use a hinge joint that will serve as a stop for the bail when let down into the dotted line position Fig. 1, so as to hold the bail out of contact with the hot vessel and thus prevent it from becoming heated, and retain it in condition always ready for use without danger of burning the user. An economical manner of providing such a stop is shown in Figs. 1, 2, 3, 4 and 5, wherein the standards are offset laterally, at 9 so that the hinge ear 10 is out of longitudinal alinement with the balance of the standard and thereby throws the base 11 of the ear into alinement with the bail, and the bail is made with jogs 12 which, when the bail is let down as in the dotted line position Fig. 1, come into contact with one or the other of the ends of the base 11 and is arrested, the base thus serving as a stop for the bail. Instead of thus constructing the standards, they may be provided in any suitable way with the stop member 13, as shown in Figs. 6 and 7, for the same purpose.

As shown in Figs. 1 and 2, the casserole or other vessel 3 may be provided with its own handles 14 by which the said vessel may be held in inserting it in and removing it from the carrier or holder; and it will be noticed that when the holder is designed to receive a vessel having its own handles, the bail will be long enough to pass below the handles 14 and leave them free for engagement by the user.

The frame, its standards, and the bail may be given any desired ornamentation, and also any desired shape to adapt the holder for use with containers or casseroles of any configuration, the drawing illustrating an oval casserole.

As will be appreciated, this low frame allows the casserole to be provided with handles on both ends for the purpose of setting it, when hot, in the frame in an easy way, and also for lifting it out; and whether the casserole is provided with handles or not the low frame is far more convenient than when it extends up practically to the full height of the casserole or vessel. The provision of the bail permits the user to carry and serve the casserole and its contents with one hand only, whereas with the high frame now in common use, both hands have to be used. Moreover, the bail keeps the hand away from the hot vessel. As already stated, the provision of the stop for the bail prevents the bail from coming into contact with the hot vessel, so that the bail is always prefectly cool and ready for use. The high uprights, as indicated, keep the filled vessel balanced and prevent it from tipping over.

The carrier or holder may be made of any available metal, such as brass, copper, steel and the like, and of a shape, round, oval, square, or otherwise, to receive correspondingly shaped casseroles or vessels.

Variations in details of construction are permissible within the scope of the invention as herein set forth and claimed.

What I claim is:—

1. A carrier for casseroles and other hot food containers, having a frame provided with a horizontal portion on which the container may rest and a short vertical portion adapted to surround and conform to the shape of the lower portion of the container, standards rising from the vertical portion of the frame at opposite points thereof and rigid therewith and extending upwardly substantially the full height of the container and at their lower portions extending on both sides of the center of gravity of the carrier in its circumferential direction so as to balance the carrier and adapted to engage the adjacent portions of the container, the horizontal and vertical portions of the frame and the standards serving to restrain transverse movement of the container within the frame, and a bail hinged to the upper ends of said standards.

2. A carrier for casseroles and other hot food containers, comprising a frame having a horizontal member to engage the bottom of a container and a vertical member to engage only the lower portion of the sides of the container, side standards on the frame conforming to the shape and height of the container and so disposed as to balance the carrier, and a bail connected with said standards by hinge joints, said hinge joints having offset ears on the standards and provided with stops, and the bail adapted to engage said stops and thereby stand off from and out of contact with the container.

3. A carrier for casseroles and other hot food containers, having a frame provided with a horizontal portion on which the container rests and a short vertical portion surrounding and conforming to the shape of the lower portion of the container, standards rising from the vertical portion at opposite points and extending substantially the full height of the container and adapted to engage the adjacent portions of the container, the horizontal and vertical portions of the frame and the standards serving to restrain lateral and endwise movement of the container, a bail hinged to the upper ends of said standards, and stop members on the standards with which the bail coöperates to limit the downward movement of the bail and hold it out of contact with the container.

In testimony whereof I have hereunto set my hand this 9th day of February A. D. 1917.

LOUIS WOJIDKOW.

Witnesses:
U. B. TYLER,
R. W. SHELTER.

Copies of this patent may be obtained for five cents each, by addressing the "Commissioner of Patents. Washington, D. C."